US012282909B2

(12) United States Patent
Todasco (10) Patent No.: US 12,282,909 B2
(45) Date of Patent: *Apr. 22, 2025

(54) TRANSMITTING DATA BASED ON RETRIEVAL LOCATIONS (71) Applicant: PAYPAL, INC., San Jose, CA (US)

(72) Inventor: Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/715,302

(22) Filed: Apr. 7, 2022

(65) Prior Publication Data
US 2022/0253827 A1 Aug. 11, 2022

Related U.S. Application Data (63) Continuation of application No. 16/000,444, filed on Jun. 5, 2018, now Pat. No. 11,301,832, which is a continuation of application No. 14/704,256, filed on May 5, 2015, now Pat. No. 9,990,624.

(51) Int. Cl.
G06Q 20/32 (2012.01)
G06Q 20/40 (2012.01)

(52) U.S. Cl.
CPC ..... *G06Q 20/3224* (2013.01); *G06Q 20/3223* (2013.01); *G06Q 20/40* (2013.01)

(58) Field of Classification Search
None
See application file for complete search history.

(56) References Cited

U.S. PATENT DOCUMENTS

| 9,171,301 B1* | 10/2015 | Gupta | G06Q 20/325 |
| 9,628,950 B1 | 4/2017 | Noeth et al. | |
| 9,824,376 B1* | 11/2017 | Amacker | G06Q 30/06 |
| 10,438,188 B1 | 10/2019 | Arora et al. | |

(Continued)

FOREIGN PATENT DOCUMENTS

| WO | 2012112413 A1 | 8/2012 |
| WO | 2016065030 A1 | 4/2016 |

OTHER PUBLICATIONS

Dominici F., et al., "NAV/COM Hybrid Architecture for Innovative Location Based Payment Systems," 6th IEEE Consumer Communications and Networking Conference, Jan. 1, 2009, 5 pages.

(Continued)

*Primary Examiner* — Hani M Kazimi
(74) *Attorney, Agent, or Firm* — .Haynes and Boone, LLP (57) ABSTRACT A system, a medium, and a method are provided to send compensation data to devices at one or more locations where the data is retrievable. For example, a communication interface of a server device accesses request data, where the request data includes an indication of one or more locations where a compensation amount is retrievable. A compensation data component generates compensation data based on the indication of the one or more locations where the compensation amount is retrievable. A location component determines a location of a client device that corresponds to the one or more locations. A transceiver transmits the compensation data to the client device based on the determined location of the client device that corresponds to the one or more locations.

20 Claims, 9 Drawing Sheets (56) References Cited

U.S. PATENT DOCUMENTS

| | | |
|---|---|---|
| 10,460,305 B1* | 10/2019 | Fine .................... G06Q 20/085 |
| 2011/0238553 A1 | 9/2011 | Raj et al. |
| 2012/0284174 A1 | 11/2012 | Bentley et al. |
| 2013/0288798 A1 | 10/2013 | Ruckart et al. |
| 2014/0258121 A1 | 9/2014 | Raman |
| 2015/0302411 A1* | 10/2015 | Bondesen .......... G06Q 20/3224 |
| | | 705/72 |
| 2016/0131492 A1 | 5/2016 | Sheha et al. |
| 2016/0132863 A1 | 5/2016 | Dodin |

OTHER PUBLICATIONS

"E-commerce shoPages.ing and payment process" published online. Mar. 12, 2015. Computer Weekly News Retrieved fromhttps://dialog.proquest.com/professional/docview/1660481829?accountid=161-862, Dec. 12, 2017, 7 pages.

Lickteig B., "State intellectual property office of china receives wang meijin's patent application for invisible payment system", Global IP News, Business and Commerce Patent News, Dec. 12, 2017, Retrieved from https://dialog.proquest.com/professional/docview/1655504008?accountid=161-862, 6 pages.

* cited by examiner

TRANSMITTING DATA BASED ON RETRIEVAL LOCATIONS

CROSS REFERENCED TO RELATED APPLICATION

This application is a continuation of U.S. patent application Ser. No. 16/000,444, filed Jun. 5, 2018, which is a continuation of application U.S. patent application Ser. No. 14/704,256, filed May 5, 2015, and issued on Jun. 5, 2018 as U.S. Pat. No. 9,990,624, the contents of which are incorporated by reference in its entirety.

TECHNICAL FIELD

This disclosure generally relates to server devices and client devices, and more particularly, to client devices receiving location-based data.

BACKGROUND

There are various ways to identify a recipient a payment. For example, the recipient may be identified by the recipient's phone number, email address, user name, and/or possibly an image or photo of the recipient, among other possible ways. Yet, consider a scenario where a user wishes to send a payment to an owner of a parked car. Perhaps the user wants to reimburse the car owner after the user accidentally bumped into the parked car, leaving a small scratch on the owner's car.

As such, the user may wish to reimburse the car owner for the scratch. Yet, the car owner may not be identifiable. Thus, the user might leave a note for the car owner with the user's contact information, hoping the car owner receives the note and contacts the user. In some instances, the user might look up the car owner's license plate number and attempt to locate the car owner's contact information. Yet further, after obtaining the contact information, the user may then attempt to inform the car owner of the scratch. Even further, after informing the car owner of the scratch, the user might then be able to find a way to reimburse the car owner.

As shown in the scenario above, to simply reimburse the car owner for the scratch, the user may have to take numerous steps to identify the car owner, find the car owner's contact information, and determine possible ways to reimburse the car owner for the scratch. Thus, in various circumstances where a recipient of a payment is not easily identifiable, there is much need for technology that can help identify the recipient and ensure that the payment is sent and received accordingly.

Embodiments of the present disclosure and their advantages may be understood by referring to the detailed description that follows. It should be appreciated that like reference numerals are used to identify elements illustrated in one or more of the figures, where the figures illustrate various examples for purposes of examples and explanation related to the embodiments of the present disclosure and not for purposes of limitation.

DETAILED DESCRIPTION

As described in the scenario above, the recipient of the payment, e.g., the owner of the parked car, may not be easily identifiable. Yet, as opposed to going through several steps described above to identify the car owner and ensuring the car owner receives compensation for the scratch, the user may create a request to send a payment, e.g., in the form of compensation data, corresponding to the location of the parked car. For example, the request may include details describing the location of the parked car. In some instances, the user may simply hold their smartphone over the parked car to receive location data corresponding to the location of the parked car. The location data may include, for example, global positioning system (GPS) data, beacon data, WI-FI signal strength data, sensor data, temperature data, and/or other forms of data further indicative of the location of the parked car. As such, the smartphone may send the request including the compensation data and the location data to a server device indicative of the location of the parked car. Thus, when the car owner returns to the parked car and the location of the car owner's smartphone substantially matches the location stored by the server device, the car owner's smartphone may receive the compensation data from the server device to reimburse the car owner for the scratch. In some instances, the compensation amount may be directly placed in the car owner's account.

It should also be noted that the parked car may take the form of a smart device/system. In addition or alternatively, the parked car may include one or more smart devices such as a GPS navigation unit, a WI-FI communication module, and/or an automotive diagnostic system, among other devices or modules. As such, in the scenario above, the user may send the compensation data to the owner's parked car, possibly such that the data may be received by one or more of such smart devices and/or systems of the car. Thus, the car may indicate that the compensation data has been received, possibly also including an indication of the location of the scratch. Further, the car may indicate that the compensation amount has been placed in the car owner's account. In some instances, these indications may also be sent to the car owner's smartphone.

Various other scenarios may exist where the recipient of the payment need not be identified specifically, but rather more generally associated with a location. In another example, consider a scenario where a user attends a party and accidentally bumps into a vase that falls to the floor. Instead of going through steps to identify the homeowner or the host of the party, the user may create a request to send compensation data to the homeowner, possibly anonymously. The user may input the address of the house in a request to send compensation data. Further, the user may specify a time to send the compensation data to the homeowner. For example, the compensation data may be sent the next morning when the location of the homeowner's smartphone substantially matches the address of the house. Further, the user may specify other conditions to send the compensation data. For example, the user may specify that the compensation data is to be sent when only one person (e.g., the homeowner) is located at the home so as to ensure that the homeowner receives the payment, as opposed to some other individual that may be carrying a smartphone near the house, for example.

Further, it should be noted that the house may also take the form of a smart device/system or possibly include one or more other smart devices (e.g., home security devices, home entertainment systems, and/or home network systems). As such, similar to the car scenario above, the user may send the compensation data to the owner's house by possibly indicating the address of the house. Further, the user may send the data to one or more smart devices in the house, such as the home's smart entertainment system. Thus, a message may be sent to the homeowner's smartphone indicating that the home entertainment system has received compensation data and the compensation amount has been placed in the homeowner's account.

As such, in various scenarios where a particular recipient of a payment may not be identified, the user may create requests to send compensation data to recipients that may be identified at a later point in time, possibly based on location. In such instances, the user may keep the recipient of the payment unidentified until the payment is ready to be sent. In various such circumstances described herein, the user may be able to send compensation data and control the way that the compensation data is received and/or how the compensation amount is to be spent.

Figure 1:
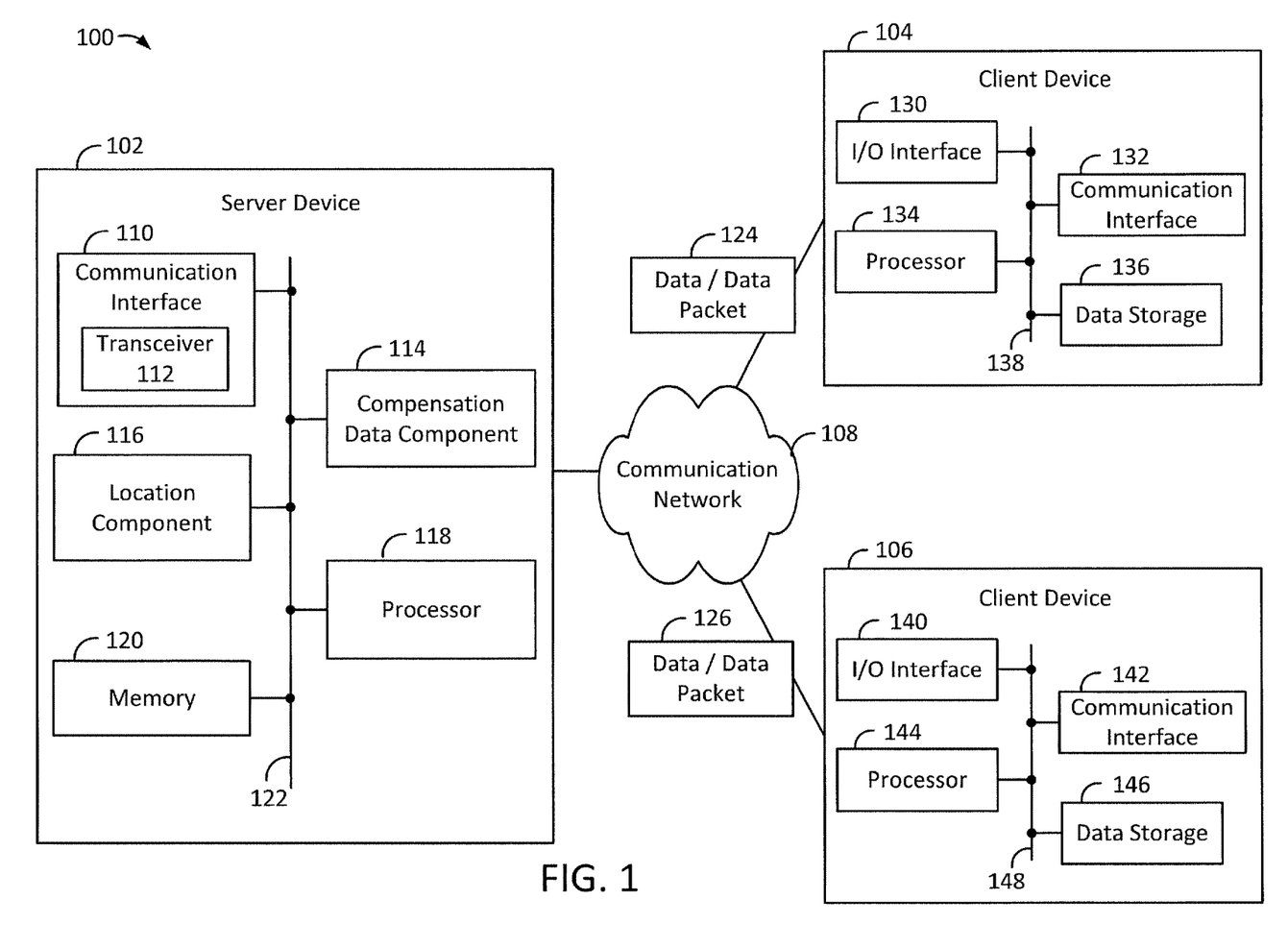
FIG. 1 is a block diagram of an example system, according to an embodiment.

FIG. 1 is a block diagram of an example system 100, according to an embodiment. As shown, the system 100 includes multiple computing devices, such as a server device 102, a client device 104, and a client device 106, among other possible computing devices. The server device 102 may be configured to support, operate, and/or manage numerous user accounts, such as those accessed by client devices 104 and/or 106. The system 100 may operate with more or less computing devices than those shown in FIG. 1, where each device may be configured to communicate over a communication network 108. As shown, the server device 102, the client device 104, and the client device 106 are each configured to communicate over the communication network 108.

The server device 102 may be configured to perform various operations in accordance with this disclosure and the accompanying figures. For example, the server device 102 may be configured to access a request 124 generated by a first user account accessed by the client device 104, where the request 124 includes an indication of one or more locations where a compensation amount is retrievable. The server device 102 may generate compensation data 126 based on the indication of the one or more locations. The server device 102 may determine a location of a client device 106 that corresponds to the one or more locations where the compensation amount is retrievable. As such, the server device 102 may transmit the compensation data 126 to the client device 106. The server device 102 may take the form of a stand-alone and/or an enterprise-class server device, another type of server device implementing one or more operating systems such as client- and/or server-based operating systems.

In some embodiments, the server device 102 may take a variety of forms and may include multiple components, including, for example, a communication interface 110, a transceiver 112, a compensation data component 114, a location component 116, a processor 118, and a memory 120, any of which may be communicatively linked to the other components via a system bus, network, or other connection mechanism 122.

The communication interface 110 may take a variety of forms and may be configured to allow the server device 102 to communicate with one or more devices according to any number of protocols. For example, the communication interface 110 may include the transceiver 112 configured to allow the server device 102 to communicate with the client devices 104 and/or 106 via the communication network 108. Further, the communication interface 112 and/or the transceiver 112 may take the form of a wired interface, such as an Ethernet interface. Yet further, the communication interface 110 and/or the transceiver 112 may take the form of a wireless interface, such as a cellular interface, a WI-FI interface, another short-range, point-to-multipoint voice and/or data transfer communication interface, such as BLUETOOTH. In some instances, the communication interface 110 and/or the transceiver 112 may send/receive data to/from client devices 104 and/or 106.

The compensation data component 114, the location component 116, and/or the processor 118 may take the form of a multi-purpose processor (e.g., a microprocessor), a special purpose processor such as a digital signal processor (DSP), an application specific integrated circuit (ASIC), a programmable system on chip (PSOC), a field-programmable gate array (FPGA), and/or another processing component configured to process data. For example, the processor 118 may process the request data 124 generated by a user account accessed by the client device 104. The compensation data component 114 may generate the compensation data based on the request data 124. The location component 116 may determine a location of the client device 106 based on location data retrieved from the client device 106. Based on the determined location of the client device 106, the transceiver 112 may transmit compensation data 126 to the client device 106.

As noted, the data/data packet 124 may be accessed from the client device 104 and the data/data packet 126 may be sent to the client device 106, thereby exchanging data over the communication network 108. Further, the data/data packets 124 and 126 may include IP addresses of the client device 104 and 106, respectively. The data packets 124 and 128 may be accessible via protocols such as Transmission Control Protocol/Internet Protocol (TCP/IP). In various embodiments, each of the packets 126 and 128 may include 1,000 to 1,500 bytes, among other possible data ranges.

The memory 120 may include one or more of volatile, non-volatile, and/or removable storage components, such as magnetic, optical, or flash storage, and may be integrated in whole or in part with the compensation data component 114, the location component 116, and/or the processor 118. Further, the memory 120 may include or take the form of a non-transitory computer-readable storage medium, having stored thereon machine-readable instructions (e.g., compiled or non-compiled program logic and/or machine code) that, when executed by the server device 102, cause the server device 102 to perform operations, such as those described in this disclosure and illustrated by the accompanying figures.

The client devices 104 and 106 may also be configured to perform a variety of operations such as those described in this disclosure and illustrated by the accompanying figures. For example, client devices 104 and 106 may be configured to exchange data/data packets 124 and/or 126 with the server device 102, that include request data, compensation data, location data, account data, and/or other types of data described above. Client devices 104 and 106 may take a variety of forms, including, for example, a personal computer (PC), a smartphone, a wearable computer, a laptop/tablet computer, a merchant device, a smart watch with appropriate computer hardware resources, a head-mountable display, other types of wearable devices, and/or other types of computing devices capable of transmitting and/or receiving data, among other possibilities. Client devices 104 and 106 may include various components, including, for example, input/output (I/O) interfaces 130 and 140, communication interfaces 132 and 142, processors 134 and 144, and data storages 136 and 146, respectively, all of which may be communicatively linked with each other via a system bus, network, or other connection mechanisms 138 and 148, respectively.

The I/O interfaces 130 and 140 may be configured to receive inputs from (and provide outputs to) respective users of the client devices 104 and 106, possibly enabling the respective users to access their accounts via client devices 104 and 106, respectively. Thus, the I/O interfaces 130 and 140 may include input hardware such as a touchscreen, a touch sensitive panel, a microphone for receiving voice commands, a computer mouse, a keyboard, and/or other input hardware. In addition, I/O interfaces 130 and 140 may include output hardware such as displays possibly with touchscreen inputs, a sound speaker, a haptic feedback system, and/or another output hardware mechanism. Further, the I/O interfaces 130 and 140 may include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to determine locations of the client devices 104 and 106, respectively.

In some embodiments, communication interfaces 132 and 142 may take a variety of forms and may be configured to allow client devices 104 and 106, respectively, to communicate with one or more devices according to any number of protocols. For instance, communication interfaces 132 and 142 may be configured to allow client devices 104 and 106, respectively, to communicate with the server device 102 via the communication network 108. The processors 134 and 144 may include general purpose processors and/or special purpose processors such as baseband and application processors. Data storages 136 and 146 may include one or more volatile, non-volatile, removable, and/or non-removable storage components, and may be integrated in whole or in part with processors 134 and 144, respectively. Further, data storages 136 and 146 may take the form of non-transitory computer-readable storage mediums, having stored thereon machine-readable instructions that, when executed by processors 134 and 144, cause client devices 104 and 106 to perform operations, respectively, such as those described in this disclosure and illustrated by the accompanying figures.

In some embodiments, the communication network 108 may exchange data among the server device 102, the client device 104, the client device 106, and/or other client devices. The communication network 108 may be a packet-switched network configured to provide digital networking communications and/or exchange data of various forms, content, type, and/or structure. The communication network 108 may correspond to small scale communication networks, such as a private and/or local area network. The communication network 108 may also correspond to a larger scale network, such as a wide area network or the Internet, possibly accessible by the various devices 102, 104, and/or 106 of the system 100. The communication network 108 may include network adapters, switches, routers, network nodes, and/or various buffers and queues to exchange data/data packets 124 and/or 126. For example, the communication network 108 may be configured transmit the first data packet 126 and the second data packet 128 including request data, compensation data, location data, account data, and/or other types of data described above. The communication network 108 may exchange such packets 124 and/or 126 between the server device 102, the client device 104, and/or the client device 106 using various protocols such as Transmission Control Protocol/Internet Protocol (TCP/IP), among other possibilities.

In some embodiments, the system 100 may include the communication interface 110 of the server device that may access request data 124 generated by a user account accessible by the client device 104, where the request data 124 includes an indication of one or more locations where a compensation amount is retrievable. The compensation data component 114 may generate compensation data based on at least the indication of the one or more locations where the compensation amount is retrievable. The location component 116 may determine a location of the client device 106 that corresponds to the one or more locations. The transceiver 112 of the communication interface 110 may transmit the compensation data 126 to the client device 106 based on at least the determined location of the client device 106 that corresponds to the one or more locations.

It can be appreciated that the server device 102 and the client devices 104 and 106 illustrated in FIG. 1 may be deployed in other ways. The operations performed and/or the services provided by such client devices 104 and 106 may be combined or separated for a given embodiment and may be performed by a greater number or fewer number of devices. Further, one or more devices may be operated and/or maintained by the same or different entities.

In some embodiments, a user account, possibly also referred to as an account, may be a compilation of data associated with a user and/or a user's interests. As such, some examples of accounts may include financial accounts, digital wallet accounts, e-commerce accounts, social networking accounts, e-mail accounts, smartphone accounts, and/or accounts with service providers, among other possibilities. For example, an account for a particular user may include a balance data, available balance data, bank and/or card data, payment data, and/or data related to the user's interest, and/or data representing the user. Further, the user may provide various other types of data to the account, such as location data where corresponding to one or more locations where a compensation amount is retrievable.

The user account may be displayed on a computing device, such as those described above in relation to FIG. 1. Thus, the user account may be displayed on a smartphone, a laptop computer, and/or a wearable computing device that may be used to access the account. The users may operate computing devices and their accounts may be managed on the computing devices. For example, a computing device may be used to create, view, and/or send request data, indications of one or more locations where a compensation amount is retrievable.

In some embodiments, a user may have a single account representing the user for multiple other accounts such as social networking accounts, e-mail accounts, and/or smartphone accounts described above, as well as accounts to websites, applications, and/or other services. For example, a user could opt to use their account as a multi-purpose account for performing various operations such as sending compensation data to one or more client devices. Further, the user may use the multi-purpose account to generate data indicating one or more locations where a compensation amount is retrievable, generate compensation data, and transmit the compensation data to client devices based on their locations.

In some embodiments, a user account may be created by one or more users. Further, the account may be created by online payment services, applications, and/or websites, among other possibilities. As such, various users may have access to a particular user account. For example, the user may be a corporation with access to a corporate account, possibly for its employees, staff, worker personnel, and/or contractors, among other individuals. Thus, a user may be a robotic device/system, an automated device/system, a computing device/system, and/or another form of technology capable of sending and receiving data corresponding to the account. A user may provide a login, a password, a code, authentication data, biometric data, and/or other types of data to access the account.

Figure 2A:
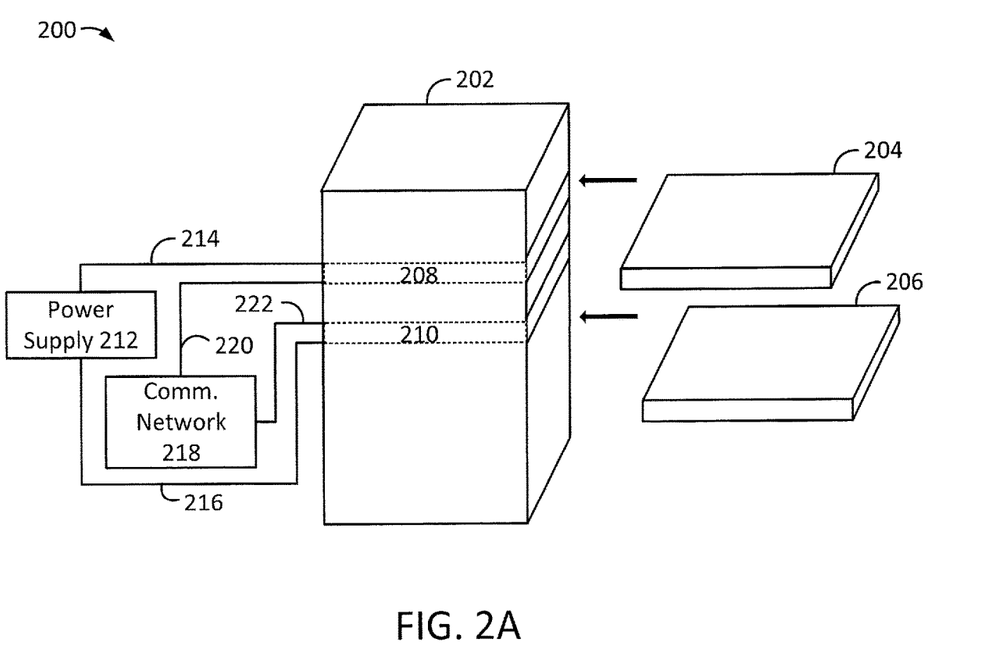
FIG. 2A illustrates an exemplary server device configured to support a set of trays, according to an embodiment.

FIG. 2A illustrates an exemplary server device 200 configured to support a set of trays, according to an embodiment. The server device 200 may, for example, take the form of the server device 102 described above in relation to FIG. 1. Further, the server device 200 may be configured to support, operate, run, and/or manage numerous user accounts and various types of data including request data, compensation data, location data, account data, and/or other types of data described above.

As shown, server device 200 may include a chassis 202 that may support trays 204 and 206, and possibly multiple other trays as well. The chassis 202 may include slots 208 and 210 configured to hold trays 204 and 206, respectively. For example, the tray 204 may be inserted into the slot 208 and the tray 206 may be inserted into the slot 210. Yet, the slots 208 and 210 may be configured to hold the trays 204 and 206 interchangeably such that the slot 208 may be configured to hold the tray 206 and the slot 210 may be configured to hold the tray 204. For example, during operation of server device 200, the tray 204 may be inserted into the slot 208 and the tray 206 may be inserted into the slot 210. Further, the trays 204 and 206 may be removed from the slots 208 and 210, respectively. Yet further, the tray 204 may be inserted into the slot 210 and the tray 206 may be inserted into the slot 208, and the server device 200 may continue its normal operation without interruptions.

The chassis 202 may be connected to a power supply 212 via connections 214 and 216 to supply power to the slots 208 and 210, respectively. The chassis 202 may also be connected to the communication network 218 via connections 220 and 222 to provide network connectivity to the slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into slots 210 and 208, respectively, and power supply 212 may supply power to trays 204 and 206 via connections 216 and 214, respectively. Yet further, trays 204 and 206 may be inserted into slots 208 and 210, respectively, and communication network 218 may provide network connectivity to trays 204 and 206 via connections 220 and 222, respectively. In addition, trays 204 and 206 may be inserted into slots 210 and 208, respectively, and communication network 218 may provide network connectivity to trays 204 and 206 via connections 222 and 220, respectively.

The communication network 218 may, for example, take the form of communication network 108 described above in relation to FIG. 1. In some embodiments, communication network 218 may provide a network port, a network hub, a network switch, or a network router that may be connected to an Ethernet link, an optical communication link, a telephone link, among other possibilities.

Figure 2B:
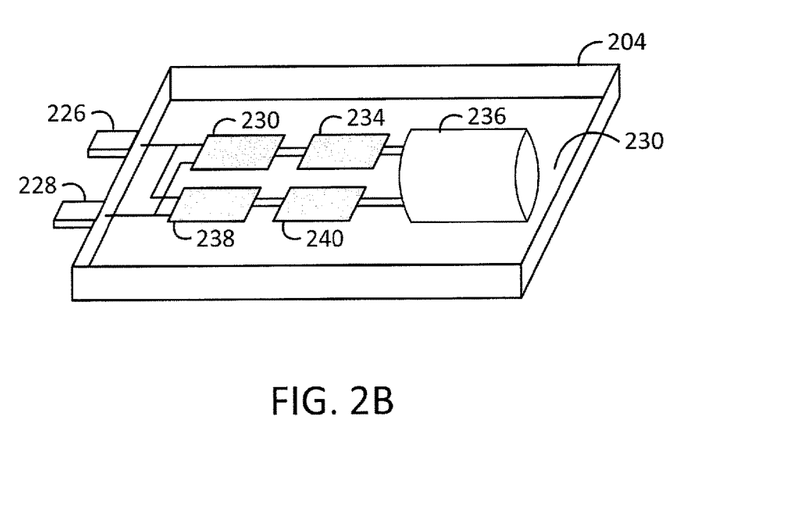
FIG. 2B illustrates an exemplary tray configured to support one or more components, according to an embodiment.

FIG. 2B illustrates an exemplary tray 204 configured to support one or more components, according to an embodiment. The tray 204 may, for example, take the form of the trays described in relation to FIG. 2A. As shown, the tray 204 may include a tray base 230 as the bottom surface of the tray 204 configured to support multiple components such as a main computing board connecting one or more components 230-240. The tray 204 may include a connection 226 that may link to the connections 214 or 216 to supply power to the tray 204. The tray 204 may also include a connection 228 that may link to the connections 220 or 222 to provide network connectivity to the tray 204. The connections 226 and 228 may be positioned on the tray 204 such that upon inserting the tray 204 into the slot 208, the connections 226 and 228 couple directly with the connections 214 and 220, respectively. Further, upon inserting the tray 204 into the slot 210, the connections 226 and 228 may couple directly with connections 216 and 222, respectively.

The tray 204 may include components 230-240. In some instances, a communication interface 230, a compensation data component 234, a location component/engine 236, a processor 238, and a memory 240 may, for example, take the form of the communication interface 110, the compensation data component 114, the location component 116, the processor 118, and the memory 120, respectively. As such, the connections 226 and 228 may be configured to provide power and network connectivity to each of the components 230-240. In some embodiments, one or more of the components 230-240 may be provided or configured via one or more circuits that include resistors, inductors, capacitors, voltage sources, current sources, switches, logic gates, registers, and/or a variety of other circuit components to perform operations described herein and illustrated by the accompanying figures. One or more of the components in a circuit may be configured to cause one or more of the components 230-240 to perform these operations. In some embodiments, a system may execute instructions on a non-transitory, computer-readable medium to configure one or more of such circuits to perform these operations.

Any two or more of the components 230-240 described above may be combined in whole or in part to take the form of one or more general purpose processors, microprocessors, and/or special purpose processors, among other types of processors. For example, two or more of the communication interface 230, the compensation data component 234, the location component/engine 236, the processor 238, and/or the memory 240 may be combined. Further, the combined device may take the form of one or more network processors, DSPs, PSOCs, FPGAs, and/or ASICs, among other types of processing devices and/or components described above. As such, the combined device may be configured to carry out various operations of the components 230-240.

In some embodiments, a system may include the communication interface 230 of the server device 200 that accesses request data generated by a user account, where the request data includes an indication of one or more locations where a compensation amount is retrievable. The compensation data component 234 may generate compensation data based on at least the indication of the one or more locations where the compensation amount is retrievable. The location component/engine 236 may determine a location of a client device that corresponds to the one or more locations. A transceiver of the communication interface 230 may transmit the compensation data to the client device based on at least the determined location of the client device that corresponds to the one or more locations. In some embodiments, the location component/engine 236 may include a global positioning system (GPS) component, a localization component configured to perform triangulation of radio signals, and/or a signal strength component that determines the location of the client device that corresponds to an address of the one or more locations.

Figure 3A:
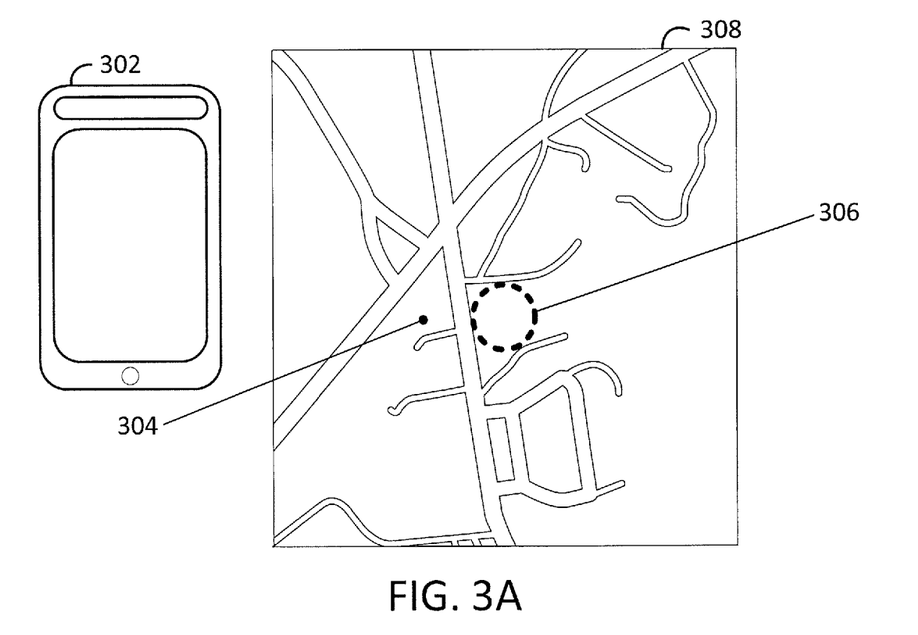
FIG. 3A illustrates a client device at a location, according to an embodiment.

FIG. 3A illustrates a client device 302 at a location 304, according to an embodiment. Referring back to the scenarios above, consider the user that wishes to send a compensation amount to the owner of the parked car. As shown in FIG. 3A, further consider that the car is parked in the one or more locations 306, represented as a dotted circle on a map 308 for illustrative purposes. Yet, the car owner, carrying the client device 302, may be at the location 304 away from the one or more locations 306. As such, the user may hold the smartphone over the parked car such that the smartphone may collect location data (e.g., GPS, proximity, Wi-Fi signal strength, and/or sensor data) indicative of the one or more locations 306. As such, the server device described above may access request data, possibly generated by the user's smartphone. Thus, the request data may include an indication of the one or more locations 306 where the compensation amount is retrievable. For example, the request data may include an address such as a residential address or a work address, and/or possibly a location name such as a name of a building or building structure (e.g., a parking structure), a name of an owner or corporation of the building, a name of a business in the building, a name of an interstate/highway or street, a name of a cross-section, a name of a park, a name of a landmark, among other possible names associated of the one or more locations 306. The compensation component of the server device may generate the compensation data based on the indication of the one or more locations 306.

Figure 3B:
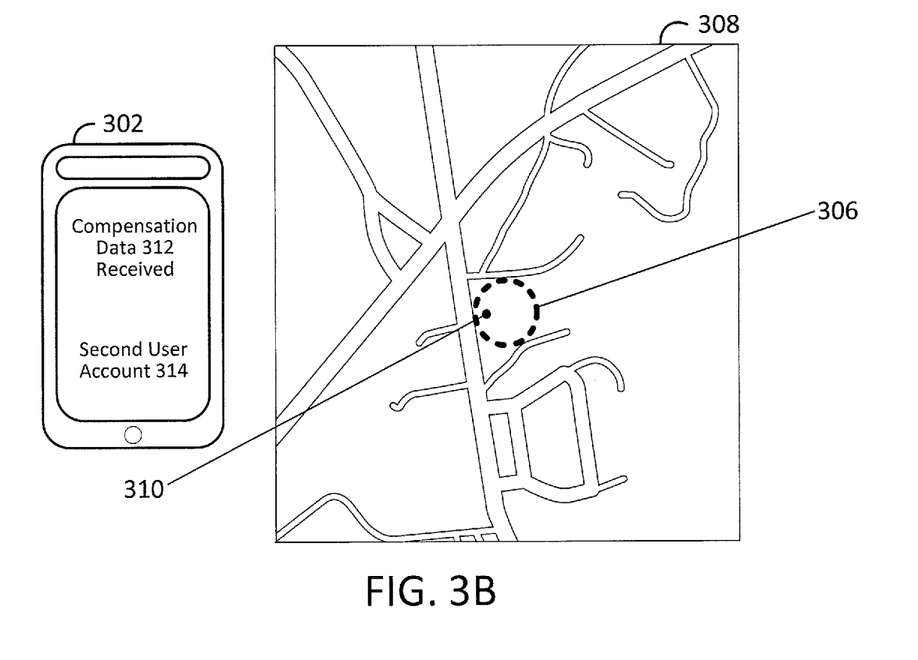
FIG. 3B illustrates a location of a client device that corresponds to one or more locations, according to an embodiment.

FIG. 3B illustrates a location 310 of the client device 302 that corresponds to one or more locations 306, according to an embodiment. As shown in FIG. 3B, consider the scenario above where the car owner is returning to the parked car carrying the client device 302. As such, the location component of the server device may determine a location 310 of the client device 302 that corresponds to the one or more locations 306 shown on the map 308. For example, the location component may include a GPS component that determines one or more locations based on a GPS coordinate, an address, a residential address, a work address, and/or a location name associated with the client device 302 that corresponds to the location 310 of the one or more locations 306. As such, the transceiver of the server device may transmit the compensation data 312 to the client device 302 based on the determined location 310 of the client device 302 that corresponds to the one or more locations 306.

In some embodiments, the compensation data 312 may be transmitted to the owner's client device 302 anonymously without any indication of the request data generated by the user account. For example, the user and the owner may have separate accounts with a payment provider such as PAY-PAL®, of San Francisco, Calif., USA. As such, the payment provider may generate the compensation data and exclude information identifying the user's account and/or the request data generated by the user's smartphone. As such, the owner may receive the compensation data anonymously without any information indicative of the user. Even further, in some instances, the user may request the compensation data anonymously such that the payment provider cannot identify the user or the user's account, possibly where the compensation amount is provided by an anonymous account. Yet, it should be noted the user may wish to provide their identification in the request. For example, based on the request of the user including the user's identification, the compensation data 312 may be accompanied with a message provided by the user indicating details of the scratch and also the user's contact information should the car owner wish to reach the user.

As shown, the owner's client device 302 may be authorized to access the car owner's account, shown as the second user account 314 in FIG. 3B. Thus, the car owner's account 314 may receive the compensation amount.

Figure 4:
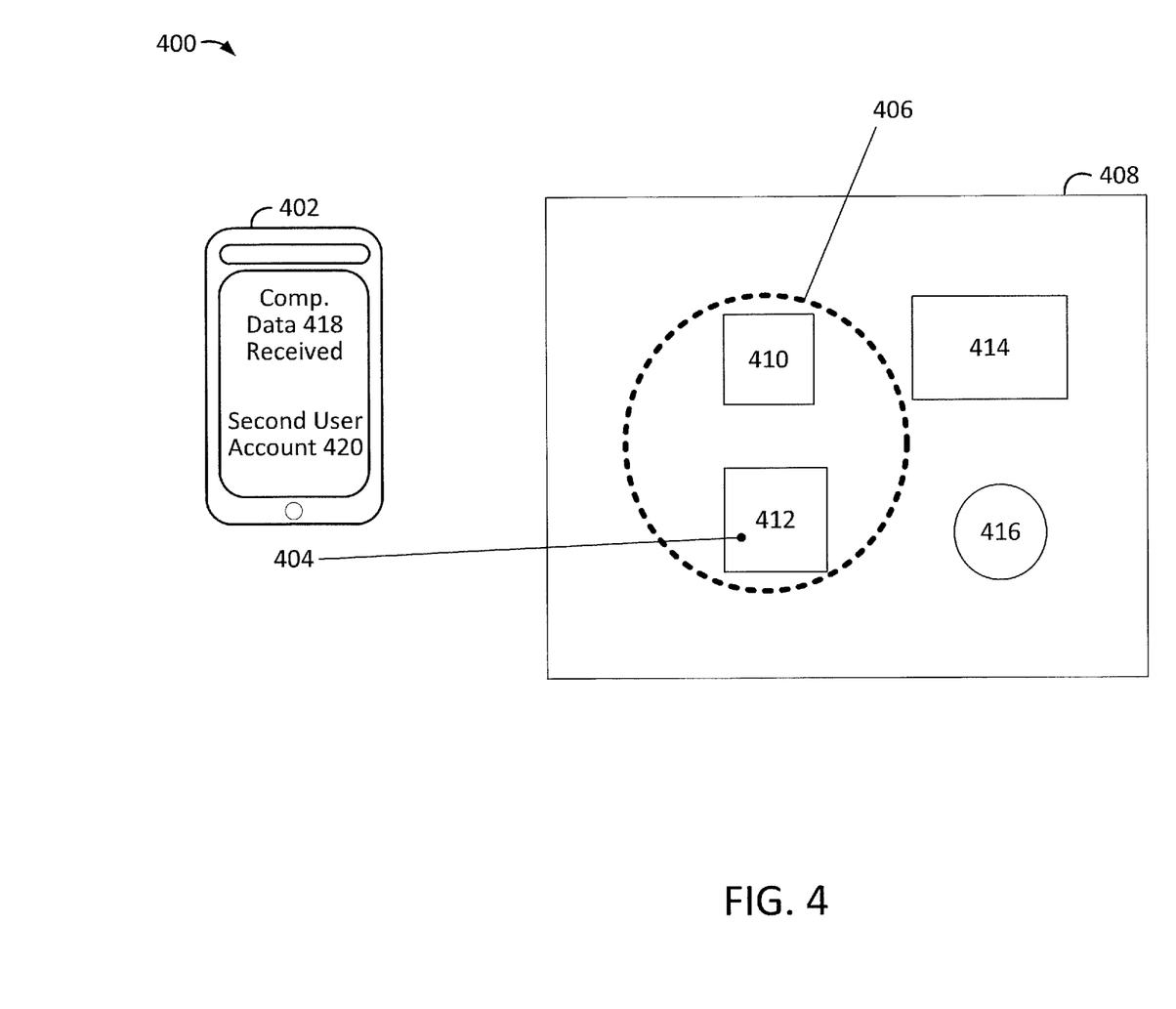
FIG. 4 illustrates a client device at a location proximate to merchant locations, according to an embodiment.

FIG. 4 illustrates a client device 402 at a location 404 proximate to merchant locations 410, 412, 414, and 416, according to an embodiment. For example, consider a scenario where a user wishes to send a payment to the user's son at the library/book store 412 shown on the map 408 for illustrative purposes. In particular, the user may wish to control when the son receives the payment, e.g., when the son is near the library/bookstore 412, and possibly where the payment is spent, e.g., at the library/bookstore 412. Thus, the user may create a request to send a compensation amount to the son's client device 402 when the son is close or near to the library/bookstore 412 while carrying the client device 402. Notably, the request data may include an indication of the son's account 420 as the account intended to receive the compensation data. As shown, the client device 402 may be authorized to access the son's user account 420, shown as the second user account 420. Further, the son's user account 420 may be permitted to receive the compensation amount, possibly based on the authorization of the client device 402 to access the son's user account 420.

In some embodiments, the request generated by the user may include an indication of a given radius based on the one or more locations 406, such as a radius of the dotted circle shown in FIG. 4. Further, the compensation amount may limited to be used within the given radius. As such, the son may be limited to using the compensation amount at the library/bookstore 412 and the merchant location 410, possibly a food court. As such, the user may control where the son may use the compensation amount to ensure that the compensation amount is not spent elsewhere.

Figure 5:
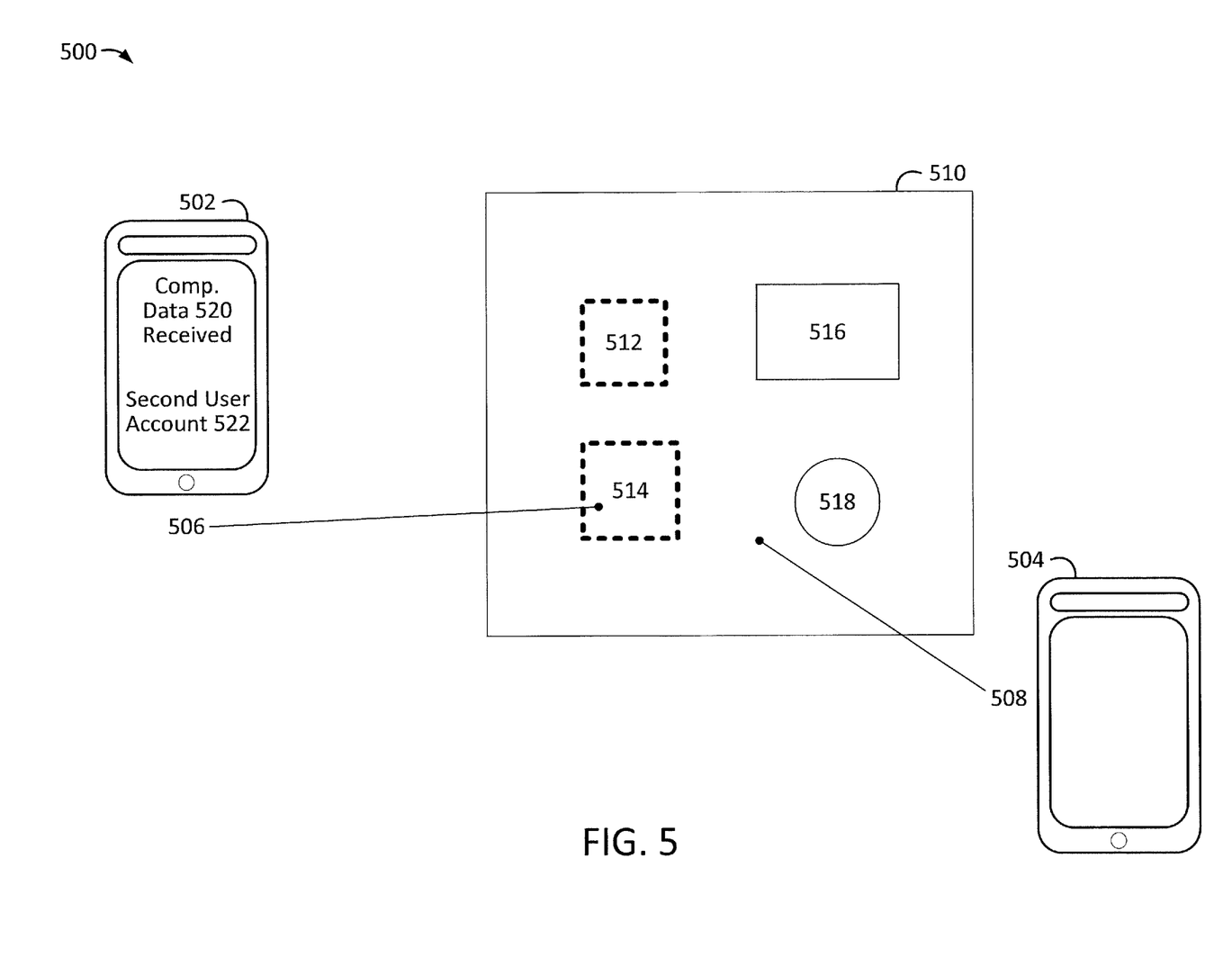
FIG. 5 illustrates multiple client devices proximate to merchant locations, according to an embodiment.

FIG. 5 illustrates multiple client devices 502 and 504 proximate to the merchant locations 512, 514, 516, and 518, according to an embodiment. For example, consider a scenario where a user wishes to send a payment to the user's son and/or nephew at the food court 512 and/or the library 514 shown on the map 510 for illustrative purposes. In particular, the user may wish to send one or more payments to the son carrying the client device 502 and/or the nephew carrying the client device 504. Thus, the user may create a request via the user's smartphone to send a compensation amount to the son's client device 502 and/or the nephew's client device 504 when one or both of them reach the food court 512 and/or the library 514.

In some embodiments, the request data may include an indication of one or more merchant accounts, merchant names, and/or the locations 512 and 514. Further, the compensation amount may be limited to be used with the one or more merchant accounts and/or at the locations 512 and 514. As such, the user may control where and how the son and/or the nephew may use the compensation amount.

As described above, the request data may include an indication of a number of user accounts permitted to receive the compensation data. In the example above, the request data may include an indication of the son's account and/or the nephew's account permitted to receive the compensation data. Further, the son's client device 502 may be authorized to access the son's user account 522, shown as the second user account 522, where the second user account 522 is one of the number of accounts indicated in the request. As such, the second user account 522 may be permitted to receive the compensation amount based on the authorization of the client device 502 to access the second user account 522 and the second user account 522 being one account of the number of accounts indicated in the request.

As shown in FIG. 5, the son's client device 502 is at a location 506 corresponding to the merchant location 514. As such, the client device 502 may receive the compensation data 520, where the compensation amount may be placed in the son's user account 522. Yet, the nephew's client device 504 may be at a location 508 away or outside of the merchant locations 512 and 514. As such, the client device 504 may not receive the compensation data 520.

Figure 6:
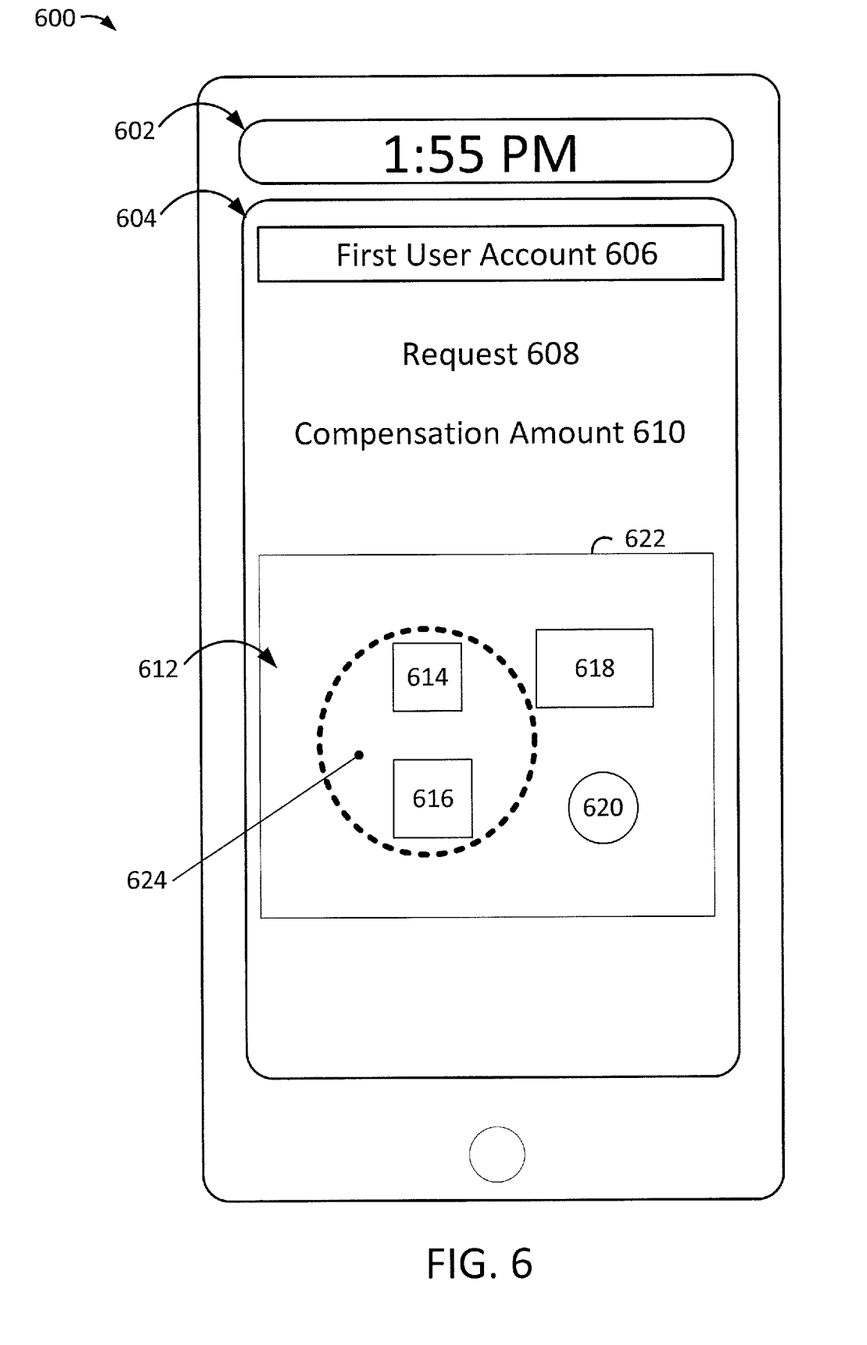
FIG. 6 illustrates a first client device displaying one or more locations, according to an embodiment.

FIG. 6 illustrates a first client device 600 displaying one or more locations 612, according to an embodiment. For example, consider the scenario above where the user creates a request to send a compensation amount to the user's son. As shown, the first client device 600 illustrates such a request. The first client device 600 is configured to display the time 602 and one or more merchant locations 614, 616, 618, and 620 on the map 622 that may, for example, correspond to the merchant locations 410, 412, 414, and 416 on the map 408 described above in relation to FIG. 4.

In some embodiments, a non-transitory computer-readable medium may have stored thereon machine-readable instructions that, when executed by the first client device 600, cause the first client device 600 to perform operations. The operations may include receiving, by an input/output (I/O) interface 604 of the first client device 600, an input of a first user account 606 that indicates a request 608 to send a compensation amount 610 based on at least one or more locations 612 represented as a dotted circle on the map 622 for illustrative purposes. The input may, for example, indicate an address based on the at least one or more locations 612.

In some instances, receiving the input may include receiving a keypad input, a voice input, and/or a selection input from a menu or a contact list (e.g., a list of locations) of the I/O interface 604. For example, a user may select an address from a number of addresses previously selected to create requests for the first user account 606. The operations may include generating, by a compensation data component of the first client device 600, compensation data based on the request 608 to send the compensation amount 610. The operations may also include determining a location 624 of a second client device that corresponds to at least one location of the one or more locations 612. The operations may also include transmitting, by a communication interface of the first client device 600, the compensation data to at least one of a server device and/or the second client device.

In some embodiments, the compensation data may be transmitted to the second client device anonymously without an indication of the input of the first user account 606 that indicates the request 608 to send the compensation amount 610 based on the one or more locations 612. In some embodiments, the second client device may be authorized to access a second user account, where the second user account receives the compensation amount 610. In some embodiments, the request 608 may include an indication of a given radius of the dotted circle shown in FIG. 6 representing the one or more locations 612. Further, the compensation amount 610 may be limited or restricted to be used within the given radius, for example, at the merchant locations 614 and/or 616.

Figure 7:
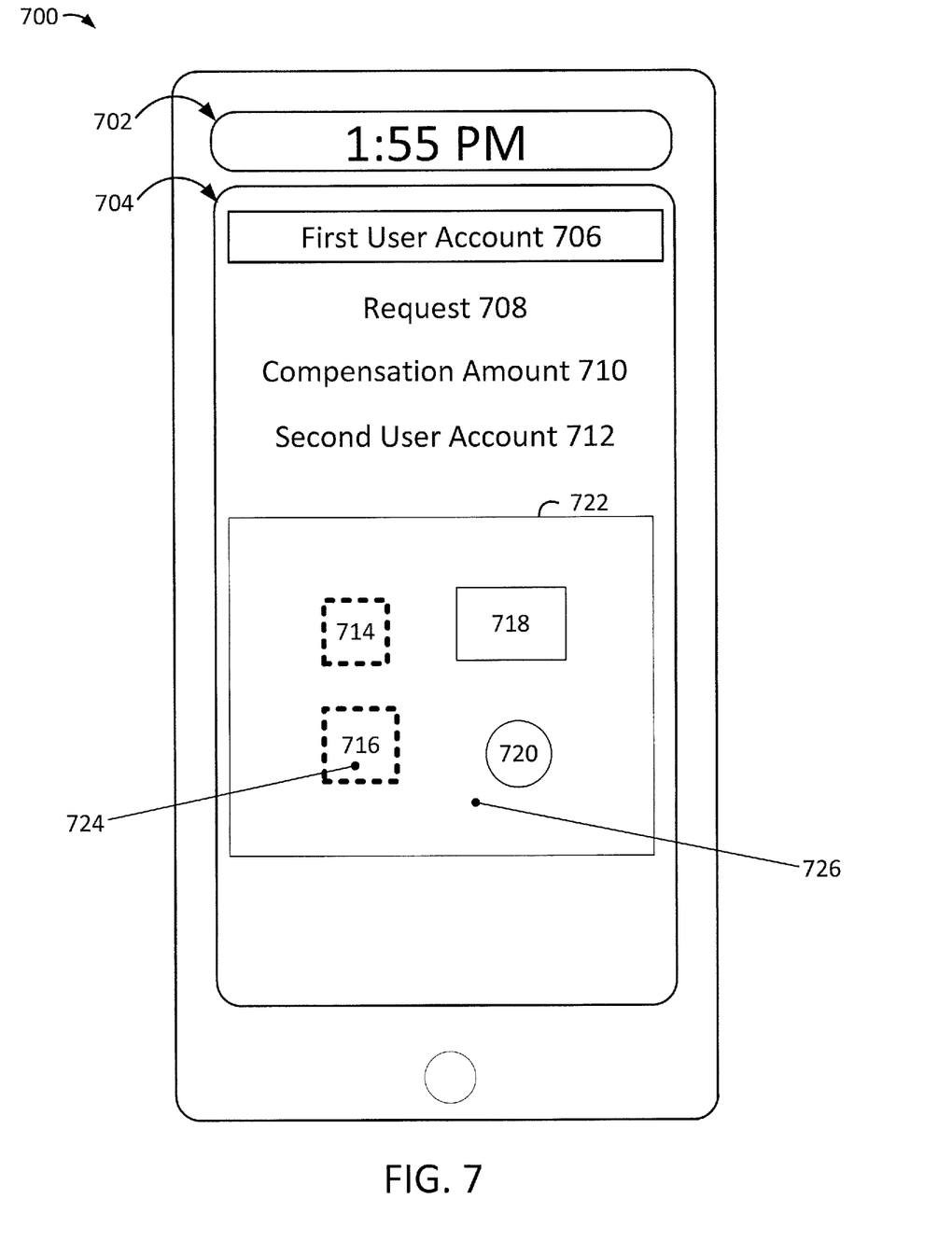
FIG. 7 illustrates a first client device and merchant locations, according to an embodiment.

FIG. 7 illustrates a first client device 700 and merchant locations 714, 716, 718, and 720, according to an embodiment. For example, consider the scenario above where the user creates a request to send a compensation amount to the user's son and/or nephew. As shown, the first client device 700 may illustrate such a request. As shown, the first client device 700 is configured to display the time 702 and one or more merchant locations 714, 716, 718, and 720 on the map 722 that may, for example, correspond to the merchant locations 512, 514, 516, and 518 on the map 510 described above in relation to FIG. 5. In some embodiments, the request 708 to send a payment may include an indication of one or more merchant accounts associated with the merchant locations 714, 716, 718, and/or 720. Further, the compensation amount 710 may be limited or restricted to be used with the one or more merchant accounts and/or locations 714 and/or 716.

In some embodiments, the request 708 may include an indication of a second user account 712 intended to receive the compensation amount 710. Referring back to the scenarios above, the second user account 712 may be the son's account and/or the nephew's account. The second client device, e.g., the son's client device or the nephew's client device, may be authorized to access the second user account. Further, the second user account may be permitted to receive the compensation amount 710 based on the authorization of the second client device to access the second user account 712.

In some embodiments, the request 708 may include an indication of a number of user accounts permitted to receive the compensation amount 710. Further, the second client device may be authorized to access the second user account 712, where the second user account 712 is one account of the number of accounts. As such, the second user account 712 may be permitted to receive the compensation amount 710 based on the authorization of the second client device to access the second user account 712 and the second user account 712 being one account of the number of accounts.

Considering one or more of the scenarios above, the son's client device may be at the location 724 proximate to the merchant location 716. As such, the son's client device may receive the compensation data, where the compensation amount 710 may be placed in the son's user account 712. Yet, the nephew's client device may be at a location 726 away from or outside of the merchant locations 714 and 716. As such, the nephew's client device may not receive the compensation data.

In practice, the embodiments described above may be utilized in various circumstances. For example, consider another scenario where the user creates the request 708 to send a compensation amount to the user's son or nephew, based on whoever reaches the location 716 first. In this scenario, consider that the location 716 is the user's home such that whoever gets home first receives the compensation amount, possibly to order dinner for the whole family.

Figure 8:
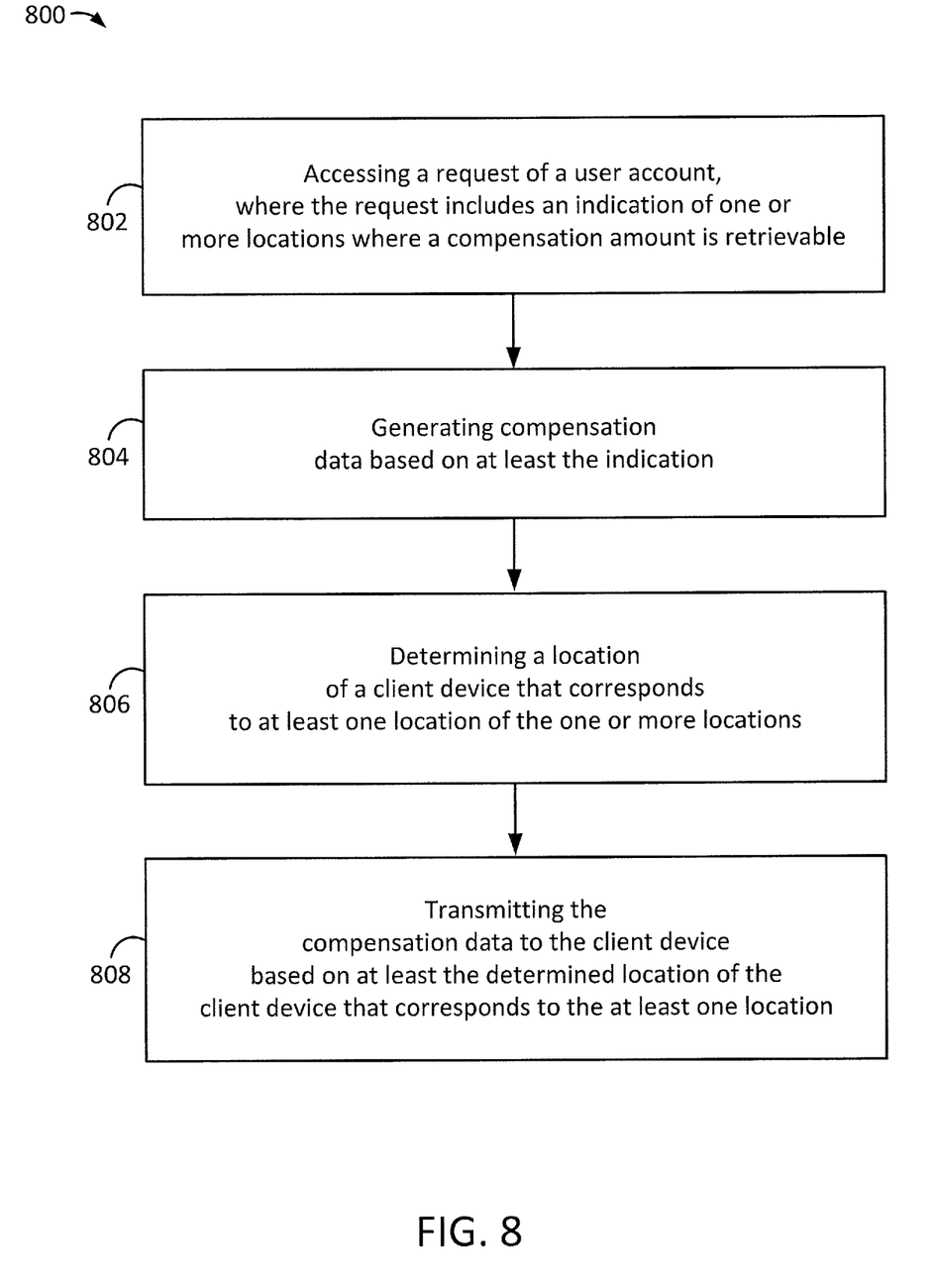
FIG. 8 is a flowchart of an exemplary method, according to an embodiment.

FIG. 8 is a flowchart of an exemplary method 800, according to an embodiment. Notably, one or more steps of the method 800 or other methods/processes described herein may be omitted, performed in a different sequence, and/or combined for various types of applications.

At step 802, the method 800 may include accessing a request of a user account. For example, the request may be created by a user who wishes to send a payment to a recipient that drops off or picks up a package delivered to the user's home. As such, the request may include an indication of one or more locations, e.g., the user's home address, where a compensation amount is retrievable. The location information may be manually entered (e.g., by entering address or a name associated with the one or more locations), selected from a drop down menu or contact list (e.g., a contact list of previously selected locations), selected via a location on a map, a name (such as a store, building, or landmark), and/or automatically selected by a user computing device, possibly by the GPS capabilities of the device.

At step 804, the method 800 may include generating compensation data based on at least the indication. As noted, the compensation data may be generated by a compensation data component described above in relation to FIGS. 1-2A. Compensation data may include an amount, a message, and any restrictions associated with receiving or accessing funds.

At step 806, the method 800 may include determining a location of a client device that corresponds to at least one location of the one or more locations. Referring back to the scenario above, the location of a delivery person's client device or smartphone may be determined to be proximate to the user's home address. Yet, in some instances, the location of a friend's client device or smartphone may be determined to be proximate to the user's home address, where the friend may be picking up the package on behalf of the user.

At step 808, the method 800 may include transmitting the compensation data to the client device based on at least the determined location of the client device that corresponds to at least one location. As such, the delivery person's client device and/or the friend's client device may receive the compensation data. For example, in some instances the compensation amount may be divided between the delivery person and the friend. As such, the delivery person's client device may receive compensation data for half of the amount and the friend's client device may receive compensation data for the other half of the amount.

In some embodiments, transmitting the compensation data to the client device may include transmitting the compensation data to the client device anonymously without an indication of the request data generated by the user account. Yet, as noted, the compensation data may also be sent with a message identifying the user as the individual that sent the compensation data.

In some embodiments, the client device that received the compensation data may be authorized to access a second user account. As such, the method 800 may further include the second user account receiving the compensation amount. For example, the friend's client device may have received the compensation data based on the friend's client device having access to the friend's user account.

In some embodiments, the request may include an indication of a second user account intended to receive the compensation data. For example, the request may include an indication of the friend's user account that is intended to receive the compensation data. Further, the friend's client device may be authorized to access the friend's user account. As such, the method 800 may include permitting the friend's user account to receive the compensation amount based on the authorization of the friend's client device to access the friend's account.

In some embodiments, the request data may include an indication of a number of user accounts permitted to receive the compensation data. For example, the request data may include an indication of the delivery person's account and the friend's account. As noted, the friend's client device may be authorized to access the friend's user account, where the friend's user account is one of the number of accounts. As such, the method 800 may include permitting the friend's user account to receive the compensation amount based on the authorization of the friend's client device to access the friend's user account and the friend's user account being one account of the number of accounts permitted to receive the compensation data.

In practice, the steps described above may be performed in various circumstances. For example, consider another scenario where the user creates the request to send a compensation amount to a house sitter based on the house sitter reaching the user's home. In this scenario, the user may ensure that the house sitter actually arrives at the user's home before receiving the compensation amount. As such, the user may be assured that the house sitter is actually watching over the house while the user is away.

Figure 9A:
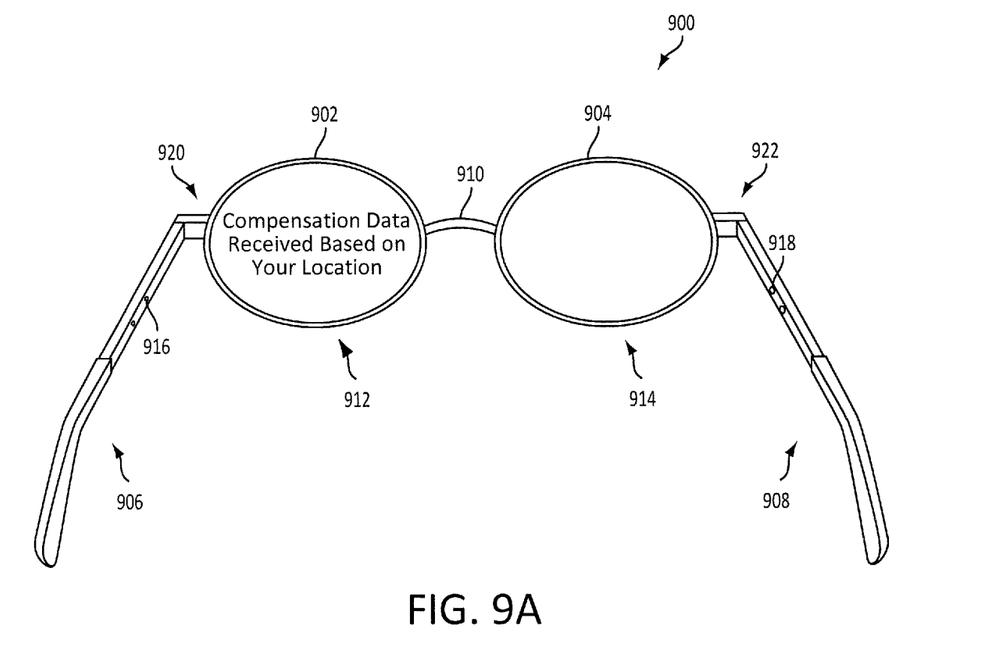
FIGS. 9A and 9B illustrate an exemplary client device, according to an embodiment.
Figure 9B:
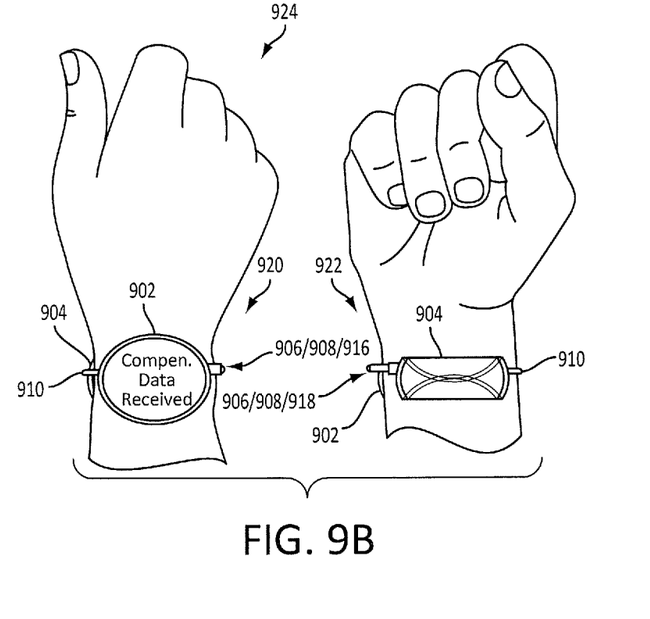

FIGS. 9A and 9B illustrate an exemplary wearable computing device 900, according to an embodiment. For example, the method 800 described above may include causing the client device 900 to display the compensation data, as shown in FIGS. 9A and 9B.

As illustrated, the wearable computing device 900 may include a head-mountable display and an arm or wrist-mountable display. As shown in FIG. 9A, the wearable computing device 900 may be wearable as a head-mountable device (HMD). The client device 900 may include lenses 902 and 904. The client device 900 may also include a side component 906, a side component 908, and a middle component 910. For example, the computing device 900 may be mountable on a user's head such that the side component 906 rests on one ear of the user and the side component 908 rests on the other ear of the user. Further, the middle component 910 may rest on the nose of the user. In some instances, the lenses 902 and 904 may be positioned in front of the user's eyes. Further, the lenses 902 and 904 may include displays 912 and 914, respectively. In some instances, the displays 912 and 914 may be transparent, partially see-through, and/or configured to provide an augmented reality. Further, the displays 912 and/or 914 may include touch pad displays to display data and receive touch inputs such that the user can manipulate graphics provided by the displays 912 and/or 914. The lenses 902 and/or 904 may also include scanners such as laser scanners configured to scan the eyes of the user to retrieve biometric data from the user's eyes, retinas, and/or irises, possibly for authenticating the user's account.

As shown in FIG. 9B, the wearable computing device 900 may also be wearable as an arm/wrist-mountable device. Yet, the wearable computing device 900 may take the form of a bracelet, an anklet, and/or a necklace, among other forms of jewelry. As shown, the side components 906 and 908, the middle component 910, and/or the lenses 902 and 904 may be adjustable to fit on an arm and/or wrist 924 of a user. As shown, the lens 902 may be positioned on the top of the wrist 924 to operate as the face of a wrist watch. The side components 906, 908, and/or the middle component 910 may be adjusted to fit around the wrist 924. The lens 904 may be positioned on the bottom of the wrist 924. As shown, the lens 904 may be flexible, foldable, and/or retractable, among other ways to adjust into the form of a wrist-watch band.

The wearable computing device 900 may include one or more sensors 916 and/or 918 configured to receive a number of inputs associated with the user. The one or more sensors 916 and/or 918 may include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs from the user. For example, based on the way the wearable computing device 900 is worn as a head-mountable device or an arm/wrist-mountable device, the sensors 916 and/or 918 may be configured to receive inputs directly and/or indirectly from the user.

As such, payments may be sent and/or received based on location, as opposed to a recipient's specific identifier, such as a name, phone number, email address, photo, and the like. For example, a user can specify a location, such as an address of a home, a name of a business, an intersection of streets, a name of a landmark, etc., and a payment can be sent to anyone arriving at, living at, working at, owning, and/or visiting the location. Thus, multiple users (such as family members living in a house) may be able to receive a payment without entering specific identifying information for all desired users. A user may be able to receive funds as soon as the user is identified with the designated location, such as by accessing a database having addresses of all registered users with a payment provider or other accessible databases, including the Internet. Further, a user may only be able to receive funds when the user is detected at a designated location. Thus, based on location, payments may be more easily sent and/or more easily controlled.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A method for processing location-based transactions, the method comprising:
   receiving, by a computer server associated with a payment service provider and from a first user device, a transaction request to provide a transaction amount from a first user account administered by the payment service provider without specifying a recipient or a recipient account;
   determining, by the computer server, a location at which the transaction amount is retrievable based on first location data obtained from a first global positioning system component of the first user device;
   subsequent to receiving the transaction request, detecting that a second user device is within a distance threshold from the location based on second location data obtained from a second global positioning system component of the second user device, wherein the second user device is associated with a second user account administered by the payment service provider;
   in response to detecting that the second user device is within the distance threshold from the location, designating, by the computer server, the second user account as the recipient account for the transaction request; and
   providing the transaction amount from the first user account to the second user account associated with the second user device.

2. The method of claim 1, wherein the second user device is associated with a merchant.

3. The method of claim 1, wherein the designating the second user account as the recipient account for the transaction request is based on merchant type information comprised in the transaction request.

4. The method of claim 1, wherein the location corresponds to a merchant location of a merchant, and wherein the second user account is an account of the merchant administered by the payment service provider.

5. The method of claim 1, wherein the transaction request comprises a specified time, and wherein the transaction amount is provided to the second user account at the specified time.

6. The method of claim 1, wherein the providing the transaction amount comprises transferring the transaction amount from the first user account to the second user account.

7. The method of claim 1, wherein the providing the transaction amount to the second user account is performed without providing an identity of the first user account to the second user device.

8. The method of claim 1, wherein the transaction request includes an indication of at least one merchant type, and wherein the designating the second user account as the recipient account for the transaction request is based on a determination that a merchant type associated with the second user device matches the at least one merchant type.

9. The method of claim 1, further comprising:
   generating compensation data that represents the transaction amount and the location at which the transaction amount is retrievable, wherein the designating the second user account as the recipient account for the transaction request is based on the compensation data.

10. A server, comprising:
    a non-transitory memory storing instructions; and
    one or more hardware processors configured to execute the instructions to cause the server to perform operations comprising:
    receiving a transaction request from a first device, the transaction request for processing a transaction associated with a first account administered by the server, the transaction request specifying a transaction amount for the transaction and lacking information indicating a recipient account for the transaction;
    determining a location at which the transaction amount is retrievable based on location data obtained from a first location sensor component of the first device;
    subsequent to receiving the transaction request, detecting that a second device is within a distance threshold from the location based on a second location sensor component of the second device, wherein the second device is associated with a second account administered by the server;
    designating the second account as the recipient account for the transaction based on the second device being within the distance threshold from the location; and
    processing the transaction between the first account and the second account.

11. The server of claim 10, wherein the location corresponds to a merchant location of a merchant.

12. The server of claim 10, wherein the operations further comprise determining a user type of a user associated with the second device, wherein the designating the second account as the recipient account for the transaction is further based on the user type of the user.

13. The server of claim 10, wherein the transaction request further specifies merchant type information, and wherein the designating the second account as the recipient account for the transaction is further based on the merchant type information.

14. The server of claim 10, wherein the processing the transaction comprises transferring the transaction amount from the first account to the second account.

15. The server of claim 10, wherein the processing the transaction is performed without providing an identity of the first account to the second device.

16. A non-transitory machine-readable medium having machine-readable instructions stored thereon, the machine-readable instructions executable to cause a machine to perform operations comprising:
   receiving a request from a first device, the request for processing a transaction associated with a first account administrated by a payment service provider, the request specifying a transaction amount for the transaction without specifying a recipient or a recipient account;
   determining a location at which the transaction amount is retrievable based on first location data obtained from a first location sensor component of the first device;
   detecting that a second device is within a distance threshold from the location based on second location data obtained from a second location sensor component of the second device;
   designating a second account that is associated with the second device as the recipient account for the transaction based on the second device being within the distance threshold from the location; and
   processing the transaction between the first account and the second account.

17. The non-transitory machine-readable medium of claim 16, wherein the processing the transaction between the first account and the second account comprises providing the transaction amount from the first account to the second account.

18. The non-transitory machine-readable medium of claim 16, wherein the designating the second account as the recipient account for the transaction is further based on determining one or more merchant locations located within a second distance threshold from the location and merchant type information comprised in the request.

19. The non-transitory machine-readable medium of claim 16, wherein the designating the second account as the recipient account for the transaction is further based on a transaction type of the transaction and a user type of a user associated with the second device.

20. The non-transitory machine-readable medium of claim 16, wherein the processing the transaction is performed without indicating an identity of the first account to the second device.

* * * * *